G. L. JOHNSON.
EMERGENCY BRAKE FOR MOTOR VEHICLES.
APPLICATION FILED JULY 17, 1918.
1,293,457.
Patented Feb. 4, 1919.
2 SHEETS—SHEET 1.
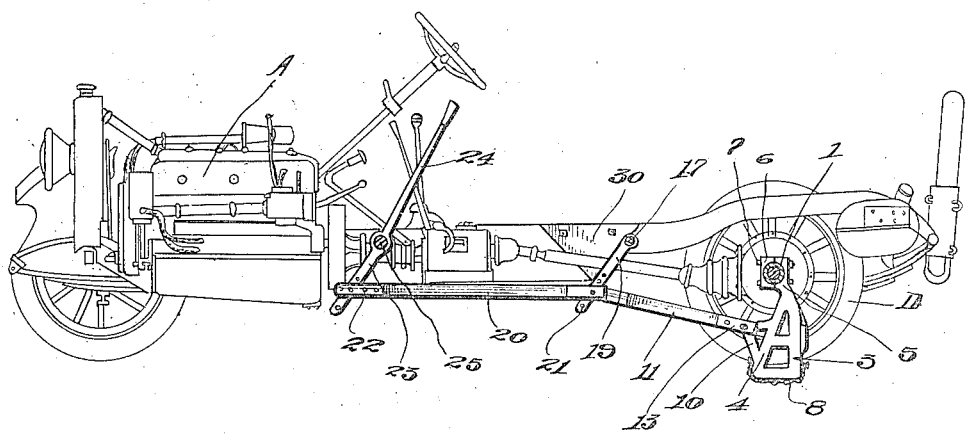

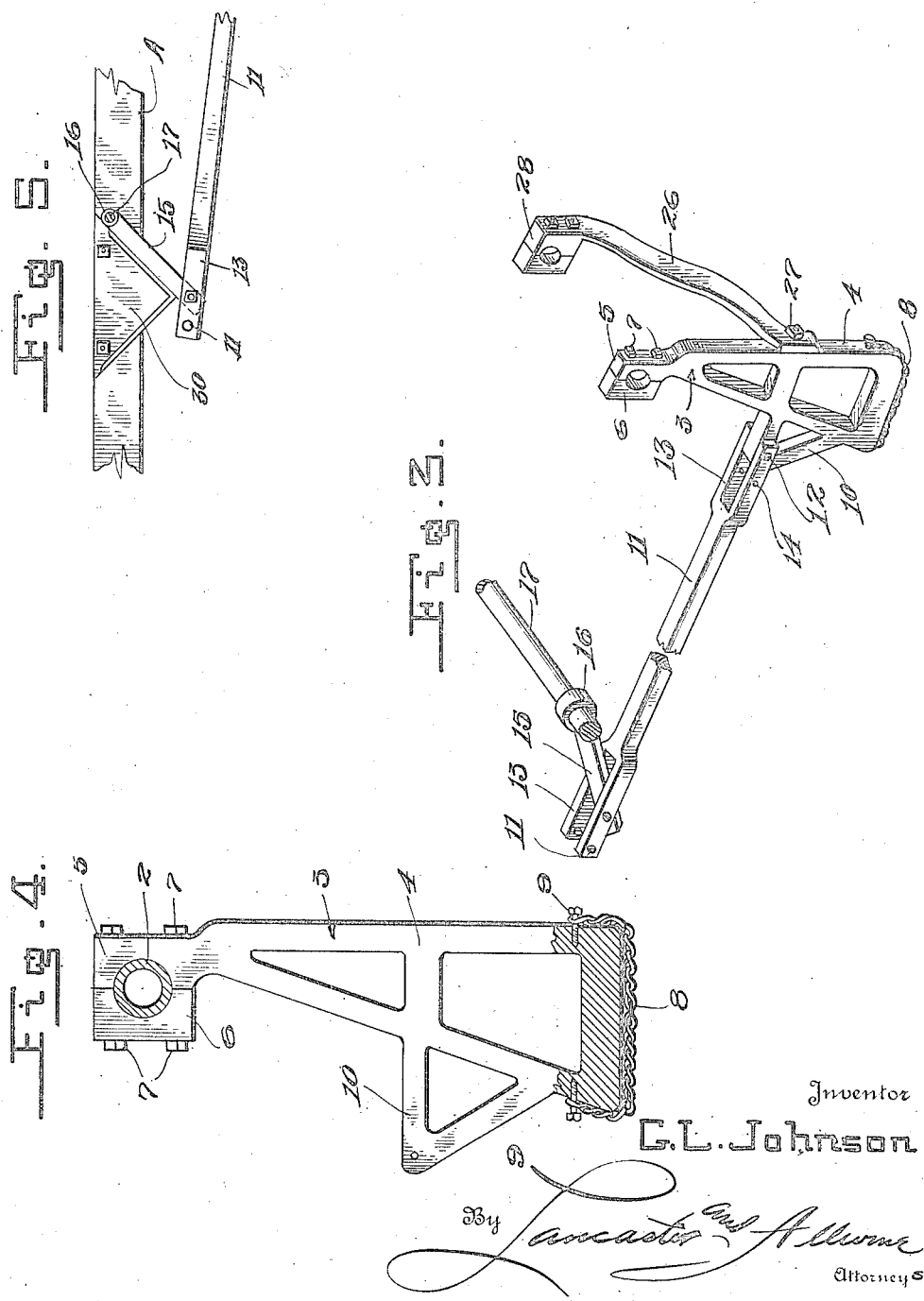

UNITED STATES PATENT OFFICE.

GUY L. JOHNSON, OF OAKLAND, CALIFORNIA.

EMERGENCY-BRAKE FOR MOTOR-VEHICLES.

1,293,457.   Specification of Letters Patent.   Patented Feb. 4, 1919.

Application filed July 17, 1918. Serial No. 245,333.

*To all whom it may concern:*

Be it known that I, GUY L. JOHNSON, a citizen of the United States, and a resident of Oakland, in the county of Alameda and State of California, have invented certain new and useful Improvements in Emergency-Brakes for Motor-Vehicles, of which the following is a specification.

This invention relates to an emergency brake or anti-skid device for use in connection with motor vehicles now upon the market and an object of the invention is to provide a device, operated through the medium of a hand lever positioned in convenient access to the driver of the vehicle, for quickly arresting either forward traveling movement or lateral skidding movement of a motor vehicle, when necessary and a device which further may be utilized, when the car is standing in a garage, to support the car off the tires of the rear wheel, relieving these tires of strain while the car is idle and consequently increasing the longevity thereof and which device may also be utilized as a jack for lifting the rear end of the vehicle, when it is desired to change a tire on one of the wheels for any reason.

More specifically, the invention comprehends the provision of a device as specified which is comparatively simple in construction, may be manufactured for a low cost and applied to any ordinary motor vehicles now upon the market, without necessitating extensive changes to the vehicle, the said device comprising a pair of shoe members rockably supported by suitable sleeves mounted upon the casing of the rear axle of the vehicle and normally swung upwardly out of a surface engaging position, by the operation of a hand lever through the medium of a rock shaft, which shoes may be quickly and easily moved into a supporting or braking position by the manipulation of the hand lever.

A further object of the invention is to detachably mount chains along the surface engaging portions or surfaces of the shoes, to increase the adhering proclivities thereof as well as the anti-skidding proclivities, which chains may be easily detached when they become worn and replaced by new ones.

Other objects of the invention will appear in the following detailed description, taken in connection with the accompanying drawings, forming a part of this specification, and in which drawings:

Figure 1 is a sectional view through the chassis of a motor vehicle showing the improved emergency brake applied thereto.

Fig. 2 is a top plan of a motor vehicle chassis having the brake applied.

Fig. 3 is a fragmentary perspective view of the brake.

Fig. 4 is a side elevation, partially in section, of one of the braking shoes.

Fig. 5 is a detail side elevation of a part of the brake structure.

Fig. 6 is a fragmentary side elevation of a motor vehicle showing the brake applied thereto, and in its normal inoperative position.

Referring more particularly to the drawings, A indicates a motor vehicle of any ordinary type, having the rear axle structure B which includes the usual casing C. The casing C of the rear axle structure B has a pair of sleeves 1 and 2 mounted thereon, one near each end of the casing and directly inwardly of the side rails of the chassis of the motor vehicle. The braking shoes or supports 3, two of which are provided, are rockably supported by the sleeves 1 and 2. The braking shoes 3 each comprise a main body 4, which is substantially triangular shape, and has an enlargement 5 formed upon its apex, which enlargement forms a bearing, co-acting with a second bearing block 6 which are connected and clamped upon the sleeves 1 or 2 by suitable bolts 7. The lower surface engaging portion or surface of the body 4 has a chain 8 of any ordinary construction, placed therealong, the ends of which chain are upturned along the edges of the body 4 and are secured to the body by suitable bolts or pins 9 to permit the ready detachment of the chain from the body 4, when it is necessary to replace a worn chain with a new one or to remove the chain for any reason. An angular bracket 10 is formed upon and extends forwardly from the forward edge of each of the bodies 4 and these angular brackets have levers 11 pivotally connected thereto as shown at 12. The ends of the levers 11 are forked, as shown at 13 and are provided with a plurality of alining openings as shown at 14 to permit adjustable connections. The forward forked ends 13 of the levers 11, are pivotally connected to arms 15 upon the upper ends of which are mounted collars 16. The collars 16 engage over a shaft 17 which is rotatably supported by suitable bearings 18. The shaft 17 has an arm 19 connected thereto intermediate its ends which arm is in turn connected to a link 20. The arm 19 is provided with a plurality of spaced openings 21 to permit adjustable connection between it and the link 20. The link 20 extends forwardly of the arm 19 and is adjustably connected, through the medium of a pin and a plurality of openings 22, with the depending ends 23 of a hand lever 24. The hand lever 24 is rockably carried by a suitable shaft 25 extending across the chassis of the motor vehicle. The hand lever 24 is positioned so that it can be conveniently reached and opererated by the driver of the vehicle and when the lever is moved rearwardly into the position shown in Fig. 1 of the drawings, the lower ends 23 thereof will be moved forwardly which will rock the link 20 and arm 19 for rocking the shaft 17, to move the levers 11 forwardly and force the braking members 3 into the braking or supporting positions as shown in Fig. 1, causing the rear wheels D of the motor vehicle to be lifted off the ground, and consequently arresting the travel of the vehicle. The chains 8 will prevent slipping or skidding movement of the braking members 3. The braking members 3 are braced by suitable angular braces 26 which are attached as shown at 27 to the rear ends of the body 4 of the braking members 3 and to a suitable bearing structure 28 which is mounted upon the sleeves 1 and 2.

The forward movement of the braking members 3 is limited by stops 30. The stops 30 are substantially triangular in shape having their apices extending downwardly and they are attached to the side rails of the chassis of the motor vehicle in any suitable manner. When the lever 24 is operated to swing the braking members 3 into operative position, the arms 15 which are connected to the levers 11 and the shaft 17 will strike against the rear inclined end of the stops 30, and arrest further forward movement of the levers 11 and consequently of the braking members 3, after these braking members have reached the perpendicular position as shown in Fig. 1 of the drawings. When it is desired to release the emergency brake structure, the hand lever 24 is pushed forwardly, which will move the lower end 23 thereof rearwardly and consequently move the braking members 3 rearwardly and upwardly, out of operative position, through the medium of the connecting levers and arms.

When the machine is standing in a garage, the braking members 3 may be moved into operative position for relieving the pneumatic tires of the rear wheels D of the supporting frame of the weight of the vehicle or if it is desired or necessary to change one of the tires of the rear wheels D, at any time, the braking members 3 may be used as jacks, for raising the wheels to permit of the ready removal of a tire therefrom.

It is to be understood, that the improved emergency brake heretofore described is not to be employed in lieu of an ordinary brake of a motor vehicle, but is to act as an emergency brake to be used only in exceptional instances, for the preventing of serious accidents, due to skidding of the vehicle, or in cases of danger of collision or other accidents where it is necessary to instantly stop the forward travel of the vehicle, and while a particular or specific construction of the brake mechanism has been heretofore described and is illustrated in the drawings, it is to be understood that various minor changes in the construction, or arrangement of parts may be resorted to without departing from the spirit of the invention, provided such alterations are comprehended within the scope of what is claimed.

What is claimed is:

1. An emergency brake for vehicles comprising sleeves for engagement about a rear axle casing, brake shoes pivotally supported by said sleeves, bearing members mounted upon said sleeves, braces extending from said bearing members to said shoes, a rock shaft, arms connected to said rock shaft, levers connected to said arms and to said shoes for operating the shoes, and stop members adapted to be engaged by said arms upon forward movement thereof to limit the forward movement of the shoes.

2. An emergency brake for vehicles comprising a pair of pivotally supported braking shoes, levers pivotally connected to said shoes, a rock shaft, arms carried by said rock shaft and pivotally connected to said levers, stop blocks adapted to be carried by a vehicle and engaged with longitudinal edgewise engagement by said arm upon forward movement thereof to limit the forward movement of the braking shoes.

3. In an emergency brake for vehicles, a substantially triangular shaped braking shoe, means carried at the apex of said shoe for pivotally and detachably connecting the shoe to the rear axle of a vehicle, the base of said shoe adapted to be moved into engagement with a road surface to provide a relatively long flat braking surface, a chain extended over the base of said shoe and having its ends turned and engaging along the lower portions of the edges of the shoe and bolts extended through the ends of the chain and into the shoe, to connect the chain to the shoe, operating means connected to the forward side of the shoe, said operating means adjustable to regulate the amplitude of movement of the shoe.

4. An emergency brake for vehicles, comprising a pair of pivotally supported braking shoes, levers pivotally connected to said shoes, a rock shaft, arms carried by said rock shaft and pivotally connected to said levers, stop blocks adapted to be carried by a vehicle and engaged with longitudinal edgewise engagement by said arms upon forward movement thereof, to limit the forward movement of the braking shoes, chains extended over the surface engaging surfaces of said shoes and having their ends turned and engaging along the lower portions of the edges of the shoes, and bolts extending through the ends of the chains and into the shoes, to connect the chains to the shoes.

GUY L. JOHNSON.